United States Patent
Hans

(10) Patent No.: US 6,840,226 B2
(45) Date of Patent: Jan. 11, 2005

(54) FUEL INJECTION VALVE

(75) Inventor: Waldemar Hans, Bamberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/276,264

(22) PCT Filed: Mar. 14, 2002

(86) PCT No.: PCT/DE02/00910

§ 371 (c)(1),
(2), (4) Date: Jun. 9, 2003

(87) PCT Pub. No.: WO02/073027

PCT Pub. Date: Sep. 19, 2002

(65) Prior Publication Data

US 2003/0183201 A1 Oct. 2, 2003

(30) Foreign Application Priority Data

Mar. 14, 2001 (DE) ........................................ 101 12 142

(51) Int. Cl.[7] ............................................. F02M 61/14
(52) U.S. Cl. ..................................... 123/470; 277/591
(58) Field of Search ........................... 123/470; 277/591

(56) References Cited

U.S. PATENT DOCUMENTS

| 2,777,431 A | | 1/1957 | Meurer ....................... 123/470 |
| 4,528,959 A | * | 7/1985 | Hauser, Jr. .................. 123/470 |

FOREIGN PATENT DOCUMENTS

| DE | 196 00 403 | | 1/1998 | |
| EP | 0 751 290 | | 1/1997 | |
| JP | 2000-170626 A | * | 6/2000 | .......... F02M/61/14 |

* cited by examiner

Primary Examiner—Andrew M. Dolinar
(74) Attorney, Agent, or Firm—Kenyon & Kenyon

(57) ABSTRACT

A fuel injector for the direct injection of fuel into the combustion chamber of a mixture-compressing internal combustion engine having external ignition includes a valve housing formed by a nozzle body, and a first sealing ring which seals the fuel injector against a cylinder head of the internal combustion engine. The first sealing ring tapers conically at a radially outer side in a flow direction of the fuel and cooperates with a second sealing ring, which tapers conically at a radially inner side counter to the flow direction of the fuel.

9 Claims, 2 Drawing Sheets

FUEL INJECTION VALVE

FIELD OF THE INVENTION

The present application relates to a configuration of a fuel injector.

BACKGROUND INFORMATION

German Published Patent Application No. 196 00 403, for example, shows an electromagnetic fuel injector and an appropriate mounting structure which satisfies requirements with respect to the sealing effect, thermal resistance and pressure resistance for an internal combustion engine having direct fuel injection. Particular attention is focused in this context to sealing the area immediately adjacent to the cylinder where the electromagnetic fuel injector is mounted, as well as to a region more distant therefrom. AS a result, according to the present invention, a first sealing section having a first sealing ring, which is configured as a wavy washer, is located close to the cylinder and between the fuel injector and the cylinder head. Moreover, a second sealing section having a second sealing ring, which is also configured as a wavy washer, is located further away from the cylinder than the first sealing section.

Disadvantages of the fuel injector of German Published Patent Application No. 196 00 403 are the manufacturing complexity and the high production cost of the sealing rings because of the refined materials, such as silver-plated INCONEL.

Additionally, a high sealing effect always necessitates a significant installation effort, requiring great mechanical forces in the installation and possibly resulting in damage to the components.

SUMMARY

In contrast, the fuel injector according to the present invention has an advantage in that a combination of two sealing rings which taper conically in the opposite direction to each other and which have a radial extension is less than the installation space, thereby allowing a simple, energy-saving installation and a reliable sealing effect in the final installed state.

In the present invention, paired washers on the inflow side and the outflow side of the sealing rings allow an even load transmission to the sealing rings.

Using a shim plate on the downstream side of the sealing ring prevents a destructive contact between the sealing ring and the mixtures present in the combustion chamber.

Moreover, the sealing effect is intensified during the operation of the fuel injector by pressure on the sealing rings by the downstream washer.

BRIEF DESCRIPTION OF THE DRAWINGS

An exemplary embodiment of the present invention is represented in the drawings in a simplified version and is described in more detail in the following description.

DETAILED DESCRIPTION

Figure 1:
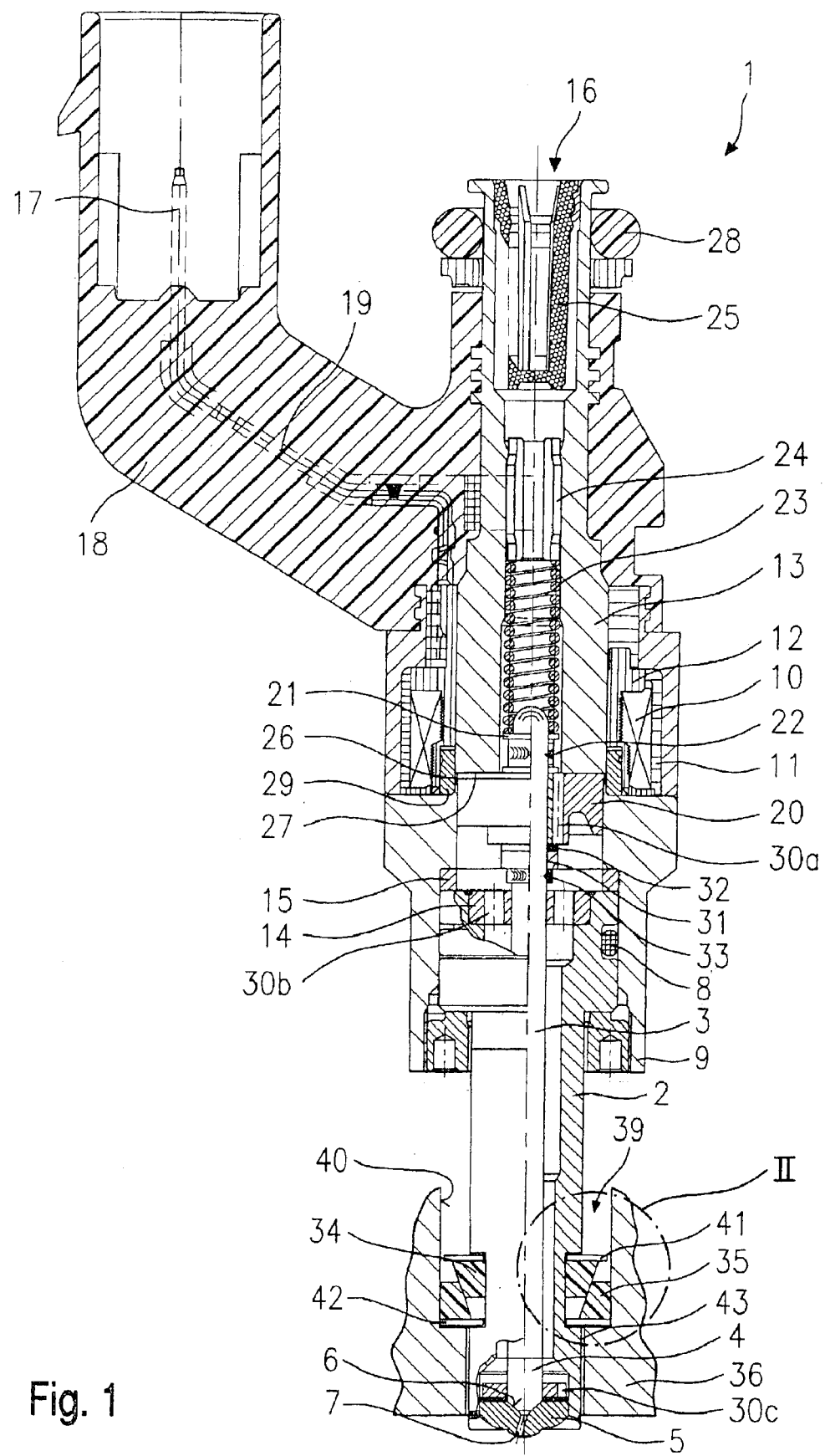
FIG. 1 is a schematic section through an exemplary embodiment of a fuel injector configured according to the present invention in an overall view.

A fuel injector 1 is configured in the form of an injector for fuel-injection systems of mixture-compressing internal combustion engines having externally supplied ignition. Fuel injector 1 is suitable for direct injection of fuel into a combustion chamber of an internal combustion engine.

Fuel injector 1 is comprised of a nozzle body 2 in which a valve needle 3 is positioned. Valve needle 3 is in operative connection with a valve-closure member 4 which cooperates with a valve-seat surface 6 arranged on a valve-seat member 5 to form a sealing seat. In the exemplary embodiment illustrated, fuel injector 1 is an inwardly opening fuel injector 1 which has a spray-discharge orifice 7.

Nozzle body 2 is sealed from an outer pole 9 of a magnetic coil 10 by a seal 8, and by a two-part sealing ring in accordance with the present invention, which is comprised of a first sealing ring 34 and a second sealing ring 35, from a cylinder head 36 of the internal combustion engine. At a radially outer side 45, first sealing rings 34 tapers conically in a flow direction of the fuel, while second sealing ring 35 tapers conically against the flow direction at a radially inner side 46. Sealing rings 34 and 35 may be made of polymers of Teflon® so as to obtain a reliable sealing effect at high stability.

Figure 2A:
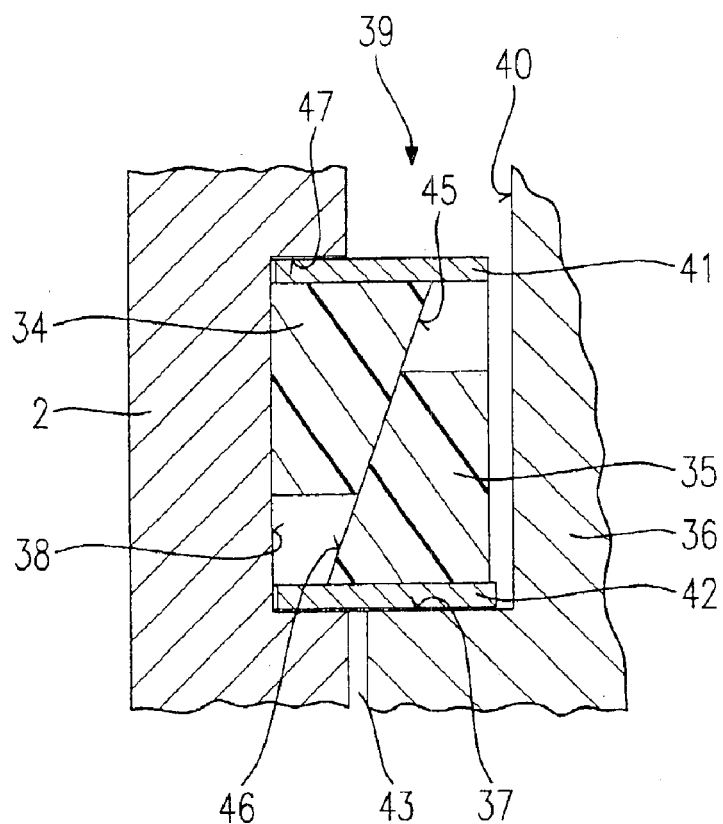
FIG. 2A is a schematic section, in the area II in FIG. 1, of the fuel injector configured according to the present invention, in a first of two consecutive installation states.

In the mounted state, as illustrated in FIG. 2A, fuel injector 1 has not yet assumed a final installation position in cylinder head 36. As soon as fuel injector 1 is pressed further into a receiving bore 39 of cylinder head 36, the desired sealing effect occurs due to an axial displacement of first sealing ring 34 into second sealing ring 35 and a subsequent widening of the latter. A detailed representation of sealing rings 34 and 35 as well as their functioning may be inferred from the description of FIGS. 2A and 2B.

Magnetic coil 10 is encapsulated in a coil housing 11 and wound on a coil brace 12, which lies against an inner pole 13 at magnetic coil 10. Inner pole 13 and external pole 9 are separated from one another by a gap 26 and are braced on a connecting member 29. Magnetic coil 10 is energized via an electric line 19 by an electric current, which may be supplied via an electrical plug contact 17. A plastic coating 18, which may be extruded onto internal pole 13, encloses plug contact 17.

Valve needle 3 is guided in a valve-needle guide 14, which is disk-shaped. A paired adjustment disk 15 is used to adjust the (valve) lift. An armature 20 is on the other side of adjustment disk 15. It is connected by force-locking to valve needle 3 via a first flange 21, and valve needle 3 is connected to first flange 21 by a welded seem 22. A return spring 23 is braced against first flange 21 which, in the present configuration of fuel injector 1, is prestressed by a sleeve 24.

A second flange 31 is located on the discharge-side of armature 20, wherein the second flange 31 is used as a lower armature stop. The second flange 31 is connected via a welding seam 33 to valve needle 3 in a force-locking manner. An elastic intermediate ring 32 is positioned between armature 20 and second flange 31 to dampen armature bounce during closing of fuel injector 1.

Fuel channels 30a through 30c extend through valve-needle guide 14, armature 20 and valve-seat member 5, conducting the fuel, supplied via a central fuel supply 16 and filtered by a filter element 25, to spray-discharge orifice 7. Fuel injector 1 is sealed from a distributor line by a seal 28.

In a rest state of fuel injector 1, return spring 23 acts upon first flange 21 at valve needle 3, contrary to the lift direction, such that valve-closure member 4 is retained in sealing contact against valve seat 6. Armature 20 rests on intermediate ring 32, which is supported on second flange 31. When magnetic coil 10 is energized, the coil builds up a magnetic field which moves armature 20 in the lift direction against the spring tension of return spring 23. Armature 20 carries along first flange 21, which is welded to valve needle 3, and thus valve needle 3 in the lift direction as well. Valve-closure member 4, being operatively connected to valve needle 3, lifts off from valve seat surface 6, and the fuel guided via fuel channels 30a through 30c to spray-discharge orifice 7 is sprayed off.

When the coil current is turned off, once the magnetic field has sufficiently decayed, armature 20 falls away from internal pole 13, due to the pressure of restoring spring 23 on first flange 21, whereupon valve needle 3 moves in a direction counter to the lift. As a result, valve closure member 4 comes to rest on valve-seat surface 6, and fuel injector 1 is closed. Armature 20 comes to rest against the armature stop formed by second flange 31.

Figure 2B:
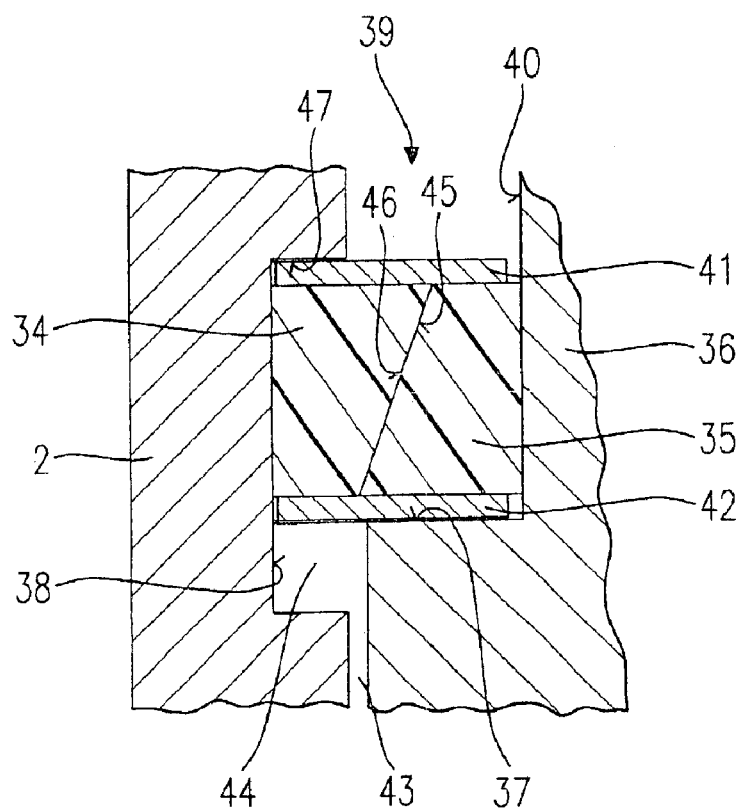
FIG. 2B is a schematic section, in the area II in FIG. 1, of the fuel injector configured according to the present invention, in a second of two consecutive installation states.

In partial sectional view, FIGS. 2A and 2B illustrate the section designated by II in FIG. 1 from fuel injector 1 as constructed according to the present invention, in various states of assembly. Identical parts are provided with the same reference numerals in all of the figures.

As previously described in FIG. 1, sealing rings 34 and 35 are configured in their radial extension so as to be insertable into receiving bore 39 of cylinder head 36 with fuel injector 1, this initially not requiring any force. To install sealing rings 34 and 35, a first washer 41 is first placed into a groove-type recess 38 of nozzle body 2. Then, sealing rings 34 and 35 are slipped axially onto nozzle body 2 until they are likewise positioned in recess 38. Finally, a second washer 42 is placed in recess 38.

Due to the special form of sealing rings 34 and 35, which taper conically in the opposite direction to one another, two cone-shaped shell surfaces abut one another by way of radially outer side 45 of first sealing ring 34 and radially inner side 46 of second sealing ring 35, so that sealing rings 34 and 35 are displacable into one another by the action of an axial pressure. Second sealing ring 35 may be widened by this, using little force, so that the desired sealing effect in the receiving bore 39 of cylinder head 36 is obtained. The necessary pressure is produced during assembly of fuel injector 1 in receiving bore 39 and is transmitted via first washer 41 to first sealing ring 34. First washer 41 abuts against an inflow-side shoulder 47 of recess 38 of nozzle body 2 and, by the installation pressure exerted in the discharge direction, is pressed against first sealing ring 34. This pressure causes first sealing ring 34 to be pressed into second sealing ring 35 thereby enlarging the ring 35. In addition, due to the prevailing pressure and the limited degree of freedom, the radial extension of first sealing ring 34 likewise increases while the axial extension decreases. In this manner, both the sealing effect as well as the final installation position of fuel injector 1 in receiving bore 39 of cylinder head 36 may be achieved.

Second washer 42 resting on a shoulder 37 of cylinder head 36, functions as a counter support, which supports second sealing ring 35 and prevents first sealing ring 34 from being pressed through in the discharge direction by second sealing ring 35. Additionally, second washer 42 may prevent a possibly destructive contact between the material of sealing rings 34 and 35 as well as the mixtures present in the combustion chamber and entering receiving bore 39 through a gap 43.

Since the combustion-chamber pressure on the combustion-chamber side of sealing rings 34 and 35 is greater than the environmental pressure on the side of sealing rings 34 and 35 facing away from the combustion chamber, combustion-chamber pressure acts upon first sealing ring 34 via gap 43 between nozzle body 2 and cylinder head 36, so that the sealing effect during the operation of fuel injector 1 is increased by first sealing ring 34 pressing against shoulder 47 of nozzle body 2 via first washer 41. A ring gap 44, produced in recess 38 of nozzle body 2 after compression, heightens this effect further.

The present invention is not limited to the exemplary embodiments illustrated and is applicable to other sealing rings 34, 35 capable of being displaced inside one another as well as to any desired construction types of fuel injectors 1, such as fuel injectors 1 integrated in a common rail system.

What is claimed is:

1. A fuel injector for direct injection of fuel into a combustion chamber of a mixture-compressing internal combustion engine having external ignition, comprising:
    a valve housing formed by a nozzle body;
    a first sealing ring configured to seal the fuel injector from a cylinder head of the internal combustion engine; and
    a second sealing ring configured to cooperate with the first sealing ring;
    wherein the first sealing ring is tapered conically at a radial exterior portion in a flow direction of the fuel, and wherein the first sealing ring contactingly cooperates with the second sealing ring, the second sealing ring being tapered conically at a radial interior portion in a direction counter to the flow direction of the fuel.

2. The fuel injector according to claim 1, wherein the first sealing ring and the second sealing ring are located in a recess of the nozzle body.

3. The fuel injector according to claim 2, further comprising:
    a first washer placed in the recess, on an inflow side of the first sealing ring.

4. The fuel injector according to claim 1, further comprising:
    a first washer placed in the recess, on an inflow side of the first sealing ring.

5. The fuel injector according to claim 4, wherein the first washer abuts against a shoulder of the recess.

6. The fuel injector according to claim 1, further comprising:
    a second washer located on a downstream side of the second sealing ring.

7. The fuel injector according to claim 6, wherein the second washer abuts against a shoulder of the cylinder head.

8. The fuel injector according to claim 1, wherein the first sealing ring is configured to be axially displaceable relative to the second sealing ring.

9. The fuel injector according to claim 8, wherein the axial displacement of the sealing rings with respect to one another results in a radial widening of the first sealing ring and the second sealing ring.

* * * * *

UNITED STATES PATENT AND TRADEMARK OFFICE
CERTIFICATE OF CORRECTION

PATENT NO.    : 6,840,226 B2
DATED         : January 11, 2005
INVENTOR(S)   : Waldemar Hans It is certified that error appears in the above-identified patent and that said Letters Patent is hereby corrected as shown below:

Column 2,
Line 20, change "sealing rings 34" to -- sealing ring 34 --.
Lines 23-24, change "made of polymers of Teflon®" to -- made of Teflon® --.

Signed and Sealed this

Twenty-third Day of August, 2005

JON W. DUDAS
*Director of the United States Patent and Trademark Office*